Sept. 2, 1947.  G. R. BURKHARDT  2,426,814
METHOD FOR TREATING METALS WITH NOBLE GASES
Filed Feb. 24, 1944  3 Sheets-Sheet 1

FIG. 2^A

INVENTOR
GEORGE R. BURKHARDT
BY
ATTY

Sept. 2, 1947.                 G. R. BURKHARDT                    2,426,814
                   METHOD FOR TREATING METALS WITH NOBLE GASES
                         Filed Feb. 24, 1944            3 Sheets-Sheet 2

INVENTOR
GEORGE R. BURKHARDT
BY
ATTY

Patented Sept. 2, 1947

2,426,814

UNITED STATES PATENT OFFICE 2,426,814

METHOD FOR TREATING METALS WITH NOBLE GASES

George R. Burkhardt, Chicago, Ill.

Application February 24, 1944, Serial No. 523,705

6 Claims. (Cl. 75—59)

This invention relates to an improvement in metallurgy resulting in a more compact and minute crystalline structure of the metal, as well as, in a removal of dissolved embrittling gases, slag inclusions and other stress raisers.

The usual practice in the manufacture of metals particularly in the manufacture of the iron-carbon alloys known as steel, results in a structure of metal having slag inclusions, dissolved gases such as hydrogen, oxygen and other chemically active gases, thereby reducing the strength of the metal. Furthermore, usual methods of manufacturing steel make difficult the control of grain size. Also, the metal poured into moulds or ingots contracts during freezing, resulting in the formation of cavities known as pipes. These pipes often extend so far down into the ingot that they are not removed when top of the ingot is cut off during the rolling operations.

One object of the invention is to provide a quiescent period in the manufacturing of certain metals such as carbon-iron alloys whereby the metal bath can lie quietly under a hot inert atmosphere for any period of time in order that suspended particles which are often microscopic in size can fully rise by gravity and thus clarify the bath.

This is impossible in the usual open hearth method of manufacturing steel because of oxidizing conditions always present. The electric furnace or crucible permits this quiescent period but not under the ideal or inexpensive conditions permitted by the improved method.

Another object of the invention is to purify metals manufactured by other processes such as the Bessemer converter. In this application, the invention provides an inert atmosphere permitting the use of any suitable temperature. It also provides the possibility of working in a non-oxidizing atmosphere. The electric process furnishes the last two conditions, however, only at much greater expense.

Accordingly, one phase of the purification of carbon-iron metals consists of tapping the metal from the open hearth furnace and running it into a chamber filled with a noble gas at high temperature, the heated noble gas maintaining the metal in fluid condition for any suitable period of time. This permits the metal to lie quietly under non-oxidizing conditions at atmospheric pressures and permits suspended particles to rise by gravity and thus clarify the bath. The slag is then carefully removed from the top of the metal and the metal is ladled into a mold.

Another object of the invention is to provide practical means of reducing, if not entirely eliminating, some of the imperfections in the finished metal discussed above. More specifically, in this part of the invention these results are obtained by working the molten metal with noble gas under high pressure either in a compression chamber adjoining the furnace in which the metal is made, or in the mold in which the metal is poured. The effect of this pressure is to control the size of the crystals of grains of the metal while it is still in semi-liquid or pasty form, i. e. during the period when freezing takes place, is to improve the physical properties of the final product. If metal is placed under compression during this period, the shrinkage cavities experienced under usual methods will be avoided and the crystalline structure of the metal will be made more compact and minute. The importance of subjecting metal in the semi-fluid state to pressure of a noble gas is seen from examination with the microscope. The crystals of metals subjected to the said pressure are all the same size, whereas the crystals of steel made by the usual methods vary in size. Accordingly, the metal treated as above described is much stronger than metal not subjected to pressure because the uniform size of crystals in the metal results in uniform distribution of stress. This consolidation of the structure and prevention of formation of large crystals have a beneficial effect on the strength and other qualities of the metal.

My experiments have shown that the gas used in the refining operation of molten steel discussed above must have the following properties:

(1) It must closely approach a perfect gas, that is, the volume must vary as the temperature.

(2) The composition of atoms of the gas must be such that electricity and heat will be readily conducted.

(3) The gas must be inert or chemically indifferent.

(4) The gas must be insoluble in molten metal.

Furthermore, my experiments demonstrate that the gases that have all of these properties and composition of atoms are only the noble gases to be found in group zero of the Mendeleef periodic table. In this table the elements are grouped so that the groups are periodic functions of the atomic number. Also my experiments showed that gases such as nitrogen did not have the atomic composition resulting in suitable thermal and electrical conductivity. Other gases such as hydrogen were good conductors of heat but were not inert. Also, my experiments showed that the cost of refining steel by use of a gas such as nitrogen would be seven times as much as if helium were used. This will be seen from the following comparison of the thermal coefficients, $K \times 10^3$ For nitrogen at 100° C., K=.0718
For helium at 100° C., K=.4994

The gases in the group zero of the periodic table are the noble gases helium, neon, argon, krypton and xenon. The use of helium is entirely practical and efficient for the purpose of the present invention.

The method is very practical and metal so processed is shown to be superior by means of the microscope and physical tests. The chemistry of the metal is no way different from that of the chemistry of metal produced by usual method, yet the microscope shows a finer grained structure and the physical tests show substantial improvement in strength. Furthermore, all fatigue tests made to date show complete absence of stress raisers such as dissolved gases. Accordingly, railroad rail manufactured from steel made under this method should be free from fissures.

In addition to attaining the objectives mentioned above, the invention also improves the condition of metal in the ingot next to the sides of the ingot mold. As molten metal is poured into a mold, the metal next to the sides and bottom of the mold are chilled by contact with the cold surfaces and this chilling forms a "skin." This skin grows in thickness as the interior of the ingot becomes cooler. This causes a contraction of the ingot and results in a space between the ingot and the side of the mold. This space is about $\frac{1}{32}''$ all around the periphery of an ingot 20" square, and in the usual methods is filled with air. This air causes the metal, around small blowholes just beneath the skin of the ingot, to become oxidized; in which case the oxidized metal is not welded up in the rolling and a seam is formed in the rolled shape. The space between the ingot and the sides of the mold in the improved method is filled with noble gas under high pressure, so that oxidation is absent and the metal in the rolled shape is free from seams due to blowholes.

The gas used may be helium, neon, argon, krypton or xenon. The use of helium is entirely practical and efficient. Helium has the following properties important in metallurgy:

(1) It is an excellent conductor of heat. Its thermal conductivity, $K \times 10^{-6}$ is 339 as compared with 56.8 for air and 56.3 for oxygen.

(2) It is insoluble in molten metal.

(3) It is entirely chemically indifferent or inert.

(4) It diffuses very rapidly.

Moreover, helium is easily separated or purified from chemically active gases such as hydrogen or nitrogen.

The practical application of the invention is exemplified by the accompanying drawings, in which:

Figure 2A is an elevational view of the furnace unit or head associated with the pouring ladle.

Figure 1:
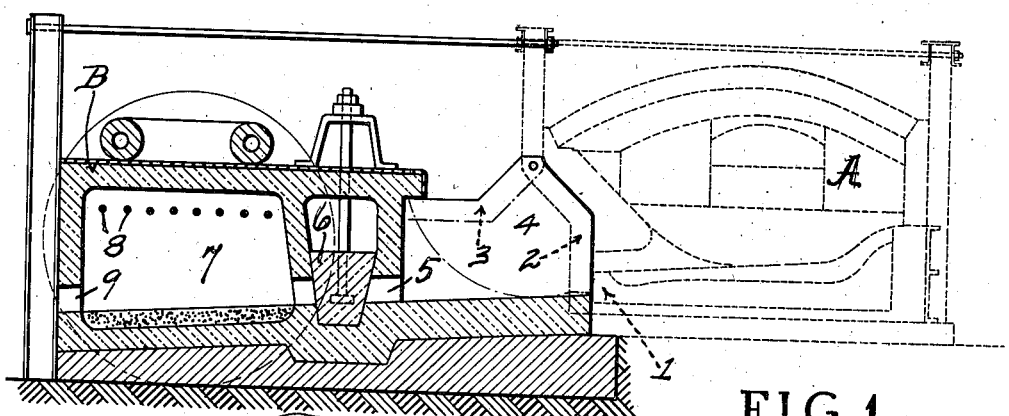
Figure 1 is a sectional view of an incandescent furnace associated with an open-hearth furnace, designated in dotted lines, illustrative of one application of the present invention.

Referring to the several drawings illustrative of different applications of the invention the procedure under the new method in connection with the apparatus shown in Fig. 1 of the drawings is that the steel is tapped from the open hearth furnace A at 1 by raising the door 2 and the door is secured in position 3. The metal flows into an enclosure bounded by a wall of the incandescent furnace B, the open hearth furnace and the enclosure sides 4, the said enclosure being covered at its top by the opened door 2. When the metal has risen to a height greater than the inlet opening 5 of the incandescent furnace, the valve 6 is opened allowing the metal to flow into the gas filled chamber 7 of the furnace B which is heated by the tungsten rods 8. The temperature in this chamber may be as high as 2190° C. or 4000° F. The metal lies in a quiescent condition for about an hour to allow the enclosed gases and slag to become freed from the bath by gravity. The slag is then carefully skimmed off and the furnace is tapped at 9 and the metal run off into ladles.

Figure 2:
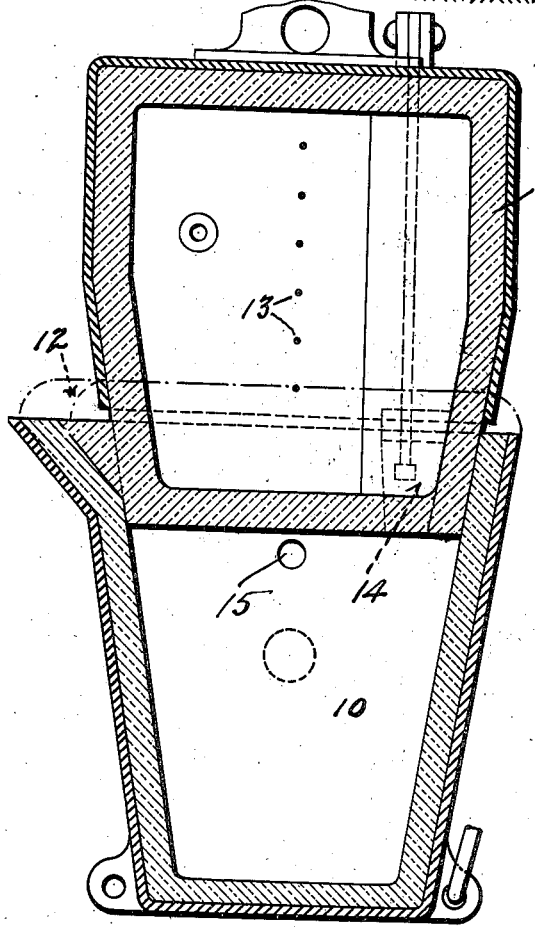
Figure 2 is a sectional view of a metal pouring ladle, associated with an incandescent furnace unit or head, illustrative of another application of the present invention.

The procedure in connection with a ladle shown in Fig. 2 is that the molten metal is run into the ladle 10, and an incandescent furnace unit or head 11 is then wedged into the ladle. Fireclay 12 may be used to seal the joint between the two. The furnace unit 11 contains noble gas heated to a temperature of 2190° C. by the tungsten rods 13. The heated gas is pumped by suitable means into the ladle through a valved gas feeding port 14. The atmosphere in the ladle is displaced through a vent opening 15 until the spectroscope shows the discharge to be pure helium. The said valved feeding port is then closed and the molten metal allowed to lie in the hot noble gas until the slag floats on the top of the metal. The slag is then carefully skimmed off and the metal is poured into the ingot mold.

Figure 3:
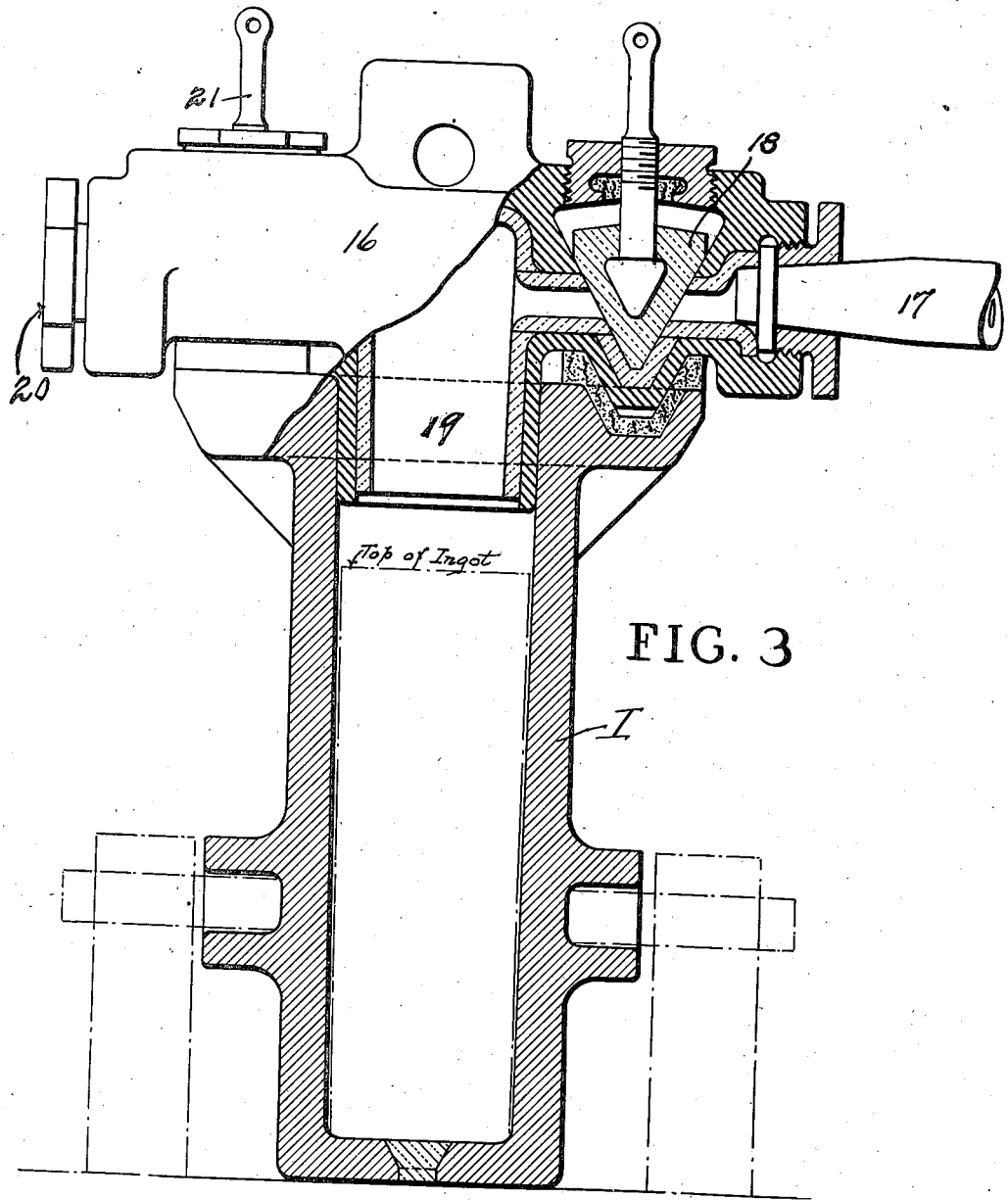
Figure 3 is a sectional view of an ingot mold, illustrative of another application of the invention.

The procedure in connection with the ingot mold is illustrated by Fig. 3 of the drawings. As here shown the ingot mold is designated by the reference letter I and to carry out the present invention there is associated with this mold a gas-feeding head 16 designed to be properly fitted over and into the upper end of the mold and provided with a noble gas intake 17, a suitably operated intake valve 18, a combined feeding and exhaust neck 19 snugly fitting within the upper open end of the ingot mold, an exhaust outlet 20 opposite the gas intake 17 and a suitably designed and suitably controlled valve 21 for opening and closing the gas exhaust outlet 20. In explanation of the invention as carried out in connection with an ingot mold and a gas feeding head 16, such as suggested in Fig. 3 of the drawings, it is to be noted that the noble gas is contained in suitable supply tanks or tank cars, under high pressure, and the maintained pressure therein is sufficient to pump out the atmosphere in the mold or supplemental pumping means can be used. In practice the molten metal is poured into the ingot mold I and the gas feeding head 16 is then inserted into the open top of the mold. The valves are then opened and the air in the mold is displaced by the incoming noble gas, after which the valve 21 of the exhaust outlet 20 is closed and the pressure of the noble gas is built up until the metal cooled to a pasty consistency is thoroughly compressed by pressure on top and sides of the ingot. Then, after a predetermined period of soaking the ingot in the heated noble gas the exhaust valve is opened to permit the noble gas to be collected for reuse.

Figure 4:
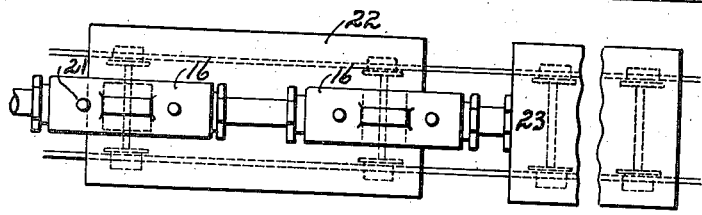
Figure 4 is a plan view or diagram illustrative of the use of the invention in connection with ingots on the conventional ingot car.

In the illustration of Fig. 4 it is to be noted that the ingots on the ingot car 22 are followed by a gas tank 23 mounted on the car.

Figure 5:
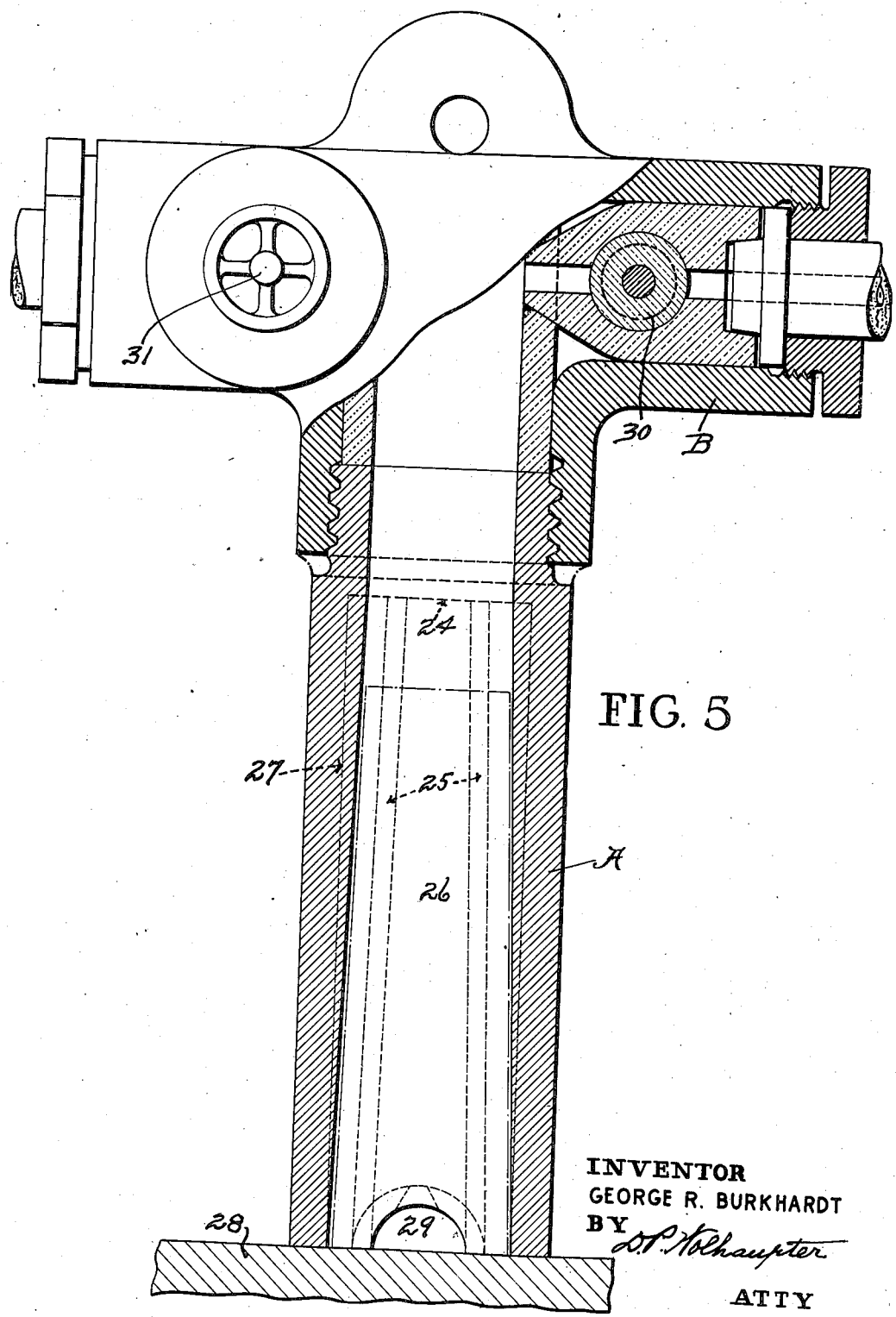
Figure 5 is a sectional view illustrative of the application of the invention in connection with an ingot mold of the bottom poured type.

In Fig. 5 of the drawings is shown a bottom-fed type of ingot mold designated generally by the letter A and which type of mold lends itself very effectively to the carrying out of the process of the present invention. The procedure in connection with the bottom-fed mold shown in Fig. 5 of the drawings is that the metal is first poured in the gate 24 at the top and rear of the mold. The sides 25 of the riser 26 are made of refractory material to hold in the heat. The refractory material is encased by a cast iron portion 27 integral with the ingot mold A which rests on the usual pouring plate 28. The metal runs into the ingot mold through the opening 29 until the molten metal is at the proper height in the ingot mold. The top B is made integral with the bottom by threading or by welding. The top contains the inlet valve 30 and exhaust valve 31. The heated helium under pressure of about 2000 pounds per square inch crushes the ingot from all sides. After the ingot has solidified the gas is pumped off and the mold lifted off the ingot by grabbing the mold through the hole at the top. The gate is burned off. This type of ingot mold prevents slag getting into the molds, prevents metal from spattering up the side of the mold and forming cold shuts, and is more practical in the improved method than in the usual mill method because the hot gas prevents the top of the ingot from cooling before the bottom.

From the foregoing it is thought that the character and scope of the invention and its many advantages will now be apparent to those skilled in the art without further description.

I claim:

1. A method for the treatment of ferrous metal which comprises subjecting the metal at a temperature at which the metal is at least semi-molten to an atmosphere of a noble gas under a high pressure, permitting the metal to remain in said atmosphere in said state in a quiescent condition for a substantial period of time, permitting the metal to solidify and thereafter removing the said gas therefrom.

2. A method for the treatment of carbon-iron alloys which comprises subjecting the said alloy at a temperature at which the alloy is at least semi-molten to an atmosphere of a noble gas under a super-atmospheric pressure not exceeding about 2,000 pounds per square inch, permitting the said alloy to remain quiescent in said atmosphere for a substantial period of time, permitting the said alloy to solidify, and thereafter removing the gas therefrom.

3. A method for the treatment of steel which comprises subjecting the said steel at a temperature at which it is at least semi-molten to an atmosphere of a noble gas under a high pressure sufficient to render the crystalline structure of the metal more compact and minute, heating the said gas extraneously to maintain said steel in said state for a sufficient period of time to provide a quiescent condition for eliminating impurities from the said steel, permitting the steel to solidify, and thereafter removing the gas therefrom.

4. A method for the treatment of steel which comprises subjecting the said steel at a temperature at which it is at least semi-molten to an atmosphere of a noble gas under a pressure approximating 2000 pounds per square inch in an ingot mold, permitting the said steel in said state to remain quiescent in said atmosphere for substantially an hour to allow the enclosed gases and slag to become freed by gravity, skimming off any supernatent slag, permitting the steel to solidify and removing the said gas after the steel has solidified.

5. An improvement in the art of metallurgy which comprises subjecting a metal at a temperature at which the metal is at least semi-molten to an atmosphere of a noble gas under a high superatmospheric pressure, permitting the metal to remain in said atmosphere in a quiescent condition in said state for a substantial period of time, thereafter solidifying the metal and then removing the said gas from the metal.

6. A method for the treatment of steel which comprises tapping steel from an open hearth furnace, running the said steel into a chamber containing noble gas at a high temperature, permitting the said steel to remain quiescent at a temperature at which the said steel is at least semi-molten, subjecting the said gas during the period of quiescence to a high pressure to form crystals of substantially the same size while the steel is still in the pasty form, thereafter solidifying the steel and then removing the said gas from the said steel.

GEORGE R. BURKHARDT.

REFERENCES CITED

The following references are of record in the file of this patent:

UNITED STATES PATENTS

| Number | Name | Date |
|---|---|---|
| 282,041 | Bennett | July 31, 1883 |
| 2,290,961 | Heuer | July 28, 1942 |
| 1,792,967 | Clark | Feb. 17, 1931 |
| 1,845,694 | Wood | Feb. 16, 1932 |
| 1,978,222 | Otte | Oct. 23, 1934 |
| 1,627,269 | Browne | May 3, 1927 |
| 1,663,916 | Mittasch et al. | Mar. 27, 1928 |